US008522543B2

(12) United States Patent
Krajnik et al.

(10) Patent No.: US 8,522,543 B2
(45) Date of Patent: Sep. 3, 2013

(54) HYDRAULIC CONTROL SYSTEM UTILIZING FEED-FORWARD CONTROL

(75) Inventors: Andrew J. Krajnik, Romeoville, IL (US); Patrick W. Sullivan, Jr., Tinley Park, IL (US)

(73) Assignee: Caterpillar Inc., Peoria, IL (US)

( * ) Notice: Subject to any disclaimer, the term of this patent is extended or adjusted under 35 U.S.C. 154(b) by 896 days.

(21) Appl. No.: 12/637,921

(22) Filed: Dec. 15, 2009

(65) Prior Publication Data

US 2010/0154400 A1 Jun. 24, 2010

Related U.S. Application Data

(60) Provisional application No. 61/193,786, filed on Dec. 23, 2008.

(51) Int. Cl.
*F16D 31/02* (2006.01)

(52) U.S. Cl.
USPC .................................. 60/452; 60/368; 60/445

(58) Field of Classification Search
USPC .................... 60/431, 445, 420, 422, 452, 368
See application file for complete search history.

(56) References Cited

U.S. PATENT DOCUMENTS

| | | | | |
|---|---|---|---|---|
| 3,744,243 | A | | 7/1973 | Faisandier |
| 3,788,775 | A | | 1/1974 | Leutner et al. |
| 4,139,987 | A | | 2/1979 | Budzich |
| 4,510,750 | A | | 4/1985 | Izumi et al. |
| 4,655,689 | A | | 4/1987 | Westveer et al. |
| 5,183,393 | A | | 2/1993 | Schaffner |
| 5,697,764 | A | | 12/1997 | Oda et al. |
| 5,865,602 | A | | 2/1999 | Nozari |
| 5,873,244 | A | * | 2/1999 | Cobo et al. ...................... 60/422 |
| 6,095,760 | A | | 8/2000 | Houtman |
| 6,375,433 | B1 | | 4/2002 | Du et al. |
| 6,468,046 | B1 | * | 10/2002 | Du et al. .................... 417/222.1 |
| 6,623,247 | B2 | | 9/2003 | Du |
| 7,059,125 | B2 | * | 6/2006 | Oka et al. ........................ 60/422 |

FOREIGN PATENT DOCUMENTS

| | | |
|---|---|---|
| EP | 0881335 | 12/1998 |
| EP | 0965698 | 12/1999 |
| EP | 1154162 | 11/2001 |
| EP | 0934448 | 4/2002 |

OTHER PUBLICATIONS

Co-pending U.S. Appl. No. 12/638,104; Hydraulic Control System Having Flow Force Compensation, filed Dec. 15, 2009.

* cited by examiner

*Primary Examiner* — Edward Look
*Assistant Examiner* — Logan Kraft
(74) *Attorney, Agent, or Firm* — Finnegan, Henderson, Farabow, Garrett & Dunner LLP

(57) ABSTRACT

The present disclosure is directed toward a hydraulic control system. The system may have a pump and a tool actuator configured to move a tool with a flow of pressurized fluid provided by the pump. The system may further have a tool control valve configured to control the flow of pressurized fluid to the tool actuator. The system may also have a controller operably connected with the tool control valve and the pump. The controller may be configured to receive a tool movement request. The controller may further be configured to estimate a change in a flow demand across the tool control valve associated with the tool movement request. The controller may also be configured to command adjustment of a discharge flow rate of the pump based on the estimated change in flow demand to satisfy the tool movement request.

19 Claims, 3 Drawing Sheets

HYDRAULIC CONTROL SYSTEM UTILIZING FEED-FORWARD CONTROL

RELATED APPLICATIONS

This application is based upon and claims the benefit of priority from U.S. Provisional Application No. 61/193,786 by Andrew Krajnik et al., filed Dec. 23, 2008, the contents of which are expressly incorporated herein by reference.

TECHNICAL FIELD

This disclosure relates generally to a hydraulic control system and, more specifically, to a hydraulic control system employing feed-forward control.

BACKGROUND

Machines such as, for example, excavators, loaders, dozers, and motor graders, often use multiple tool actuators supplied with hydraulic fluid from a hydraulic pump to accomplish a variety of tasks. These tool actuators are typically pilot controlled such that, as an operator moves an input device (e.g., a joystick) an amount of pilot fluid is directed to a tool control valve to move the tool control valve. As the tool control valve is moved, a proportional amount of fluid is directed from the pump to the tool actuators. Various hydraulic control strategies have been implemented to control the amount of fluid flow between the pump and the tool actuators, including a load sensing control strategy.

Load sensing control strategies measure a pressure differential between a maximum load pressure of a plurality of tool actuators and a pump delivery pressure. A controller typically receives the pressure differential data and controls a displacement of the pump to deliver the maximum load demand. More specifically, load sensing control systems attempt to control pump displacement to maintain a desired buffer pressure between pump delivery pressure and the maximum load pressure. In order to maintain pump control stability, the pump is typically controlled to deliver fluid at an excess pressure to ensure the maximum load pressure is available to the tool actuators.

A control system for regulating pump output is described in U.S. Pat. No. 6,374,722 (the '722 patent) issued to Du et al. on Apr. 23, 2002. The '722 patent describes a system with a variable displacement pump, a controller, a sensor, a servo valve, a servomechanism, and a servo control operable to command adjustment of a swashplate tilt angle and, hence, regulate pump discharge pressure. In the '722 patent, the controller commands adjustment of the swashplate tilt angle based upon the pump discharge pressure. The sensor generates a signal indicative of pump discharge pressure and sends this signal to the controller. Upon receiving the signal and determining an error, the controller commands the servomechanism of the servo valve to vary the swashplate tilt angle, which adjusts pump output.

Although the system of the '722 patent may increase regulation precision of pump discharge pressure, certain disadvantages may still persist. For example, a lag between the time at which an error occurs and the time when the error is corrected may cause delayed system response. Further, due to the lag, the system may be difficult to tune and prone to instability.

The disclosed system is directed to overcoming one or more of the problems set forth above and/or other problems with prior systems.

SUMMARY

In one aspect, the present disclosure is directed toward a hydraulic control system. The system may include a pump and a tool actuator configured to move a tool with a flow of pressurized fluid provided by the pump. The system may further include a tool control valve configured to control the flow of pressurized fluid to the tool actuator. The system may also include a controller operably connected with the tool control valve and the pump. The controller may be configured to receive a tool movement request. The controller may further be configured to estimate a change in a flow demand across the tool control valve associated with the tool movement request. The controller may also be configured to command adjustment of a discharge flow rate of the pump based on the estimated change in flow demand to satisfy the tool movement request.

In another aspect, the present disclosure is directed toward a method for controlling movement of a tool with a hydraulic control system. The method may include pressurizing fluid with a pump. Additionally, the method may include receiving an operator command to move the tool and estimating a change in a flow demand in the hydraulic control system based on the operator command to move the tool. The method also include adjusting a discharge flow rate of the pump based on the estimated change in the flow demand. The method may additionally include directing at least a portion of the pressurized fluid to move the tool based on the operator command.

DETAILED DESCRIPTION

Figure 1:
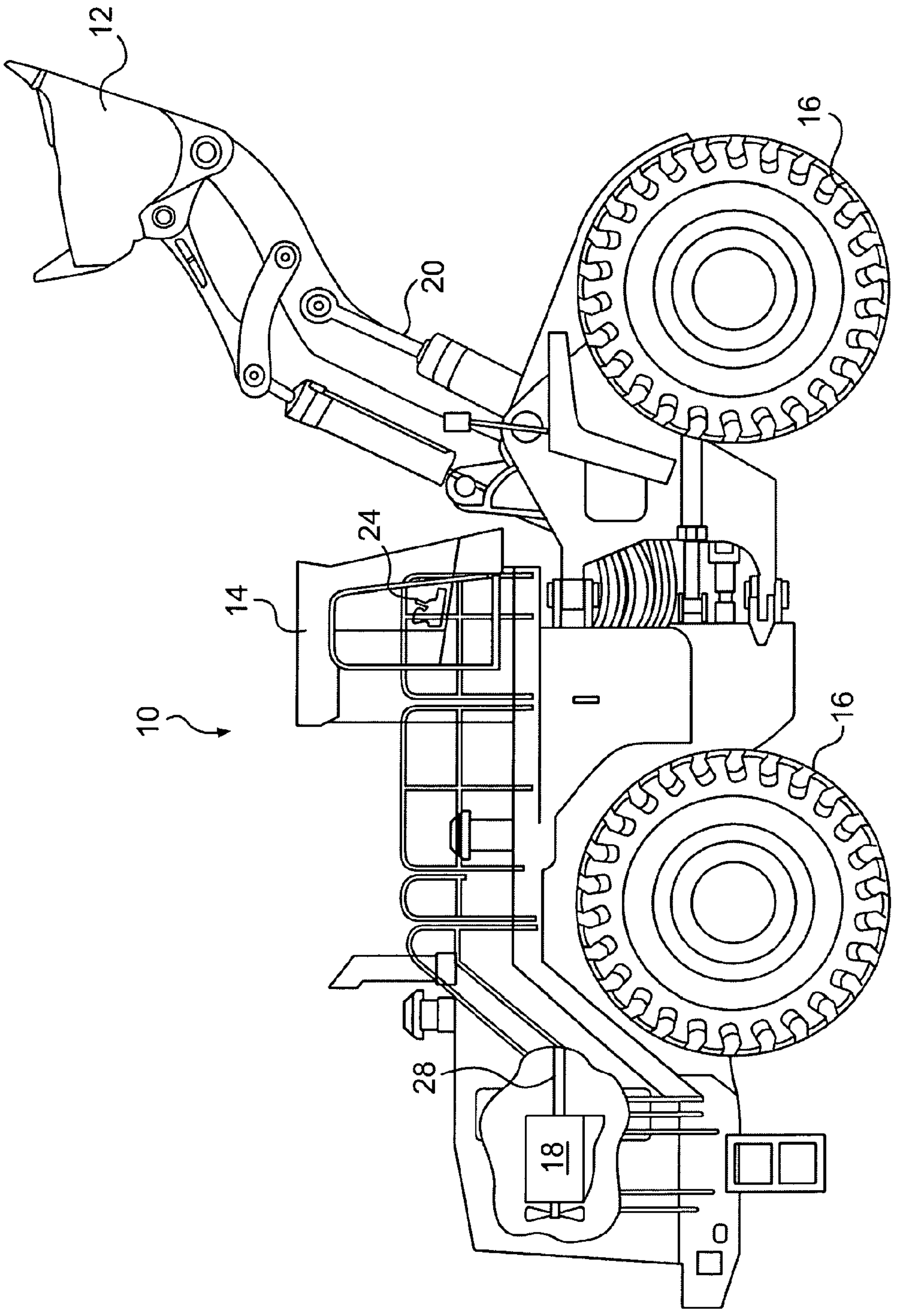
FIG. 1 is an illustration of an exemplary machine.

An exemplary embodiment of a machine 10 is illustrated in FIG. 1. Machine 10 may be a mobile or stationary machine able to perform one or more tasks. For example, machine 10 may be a front loader used in the construction industry. It is contemplated that machine 10 may be used in various industries such as transportation, mining, farming, or any other industry. In this embodiment, machine 10 may include a tool 12, an operator's station 14, one or more traction devices 16, and a power source 18.

Tool 12 may include a variety of different implements such as, for example, a bucket, a fork, a drill, a broom, a hoist, or any other implement apparent to one skilled in the art. Movement of tool 12 may be effected by one or more tool actuators including, for example, a first tool actuator 20 and a second tool actuator 22 (shown in FIG. 2), which may be controlled from operator's station 14. First and second tool actuators 20, 22 may be a pair of adjacent, double acting, hydraulic actuators configured to move tool 12 (referring to FIG. 1).

Operator's station 14 may include controls for operating and driving machine 10. One such control may include a tool control device, for example, a joystick 24 operable to regulate the movement of tool 12 by way of first and second tool actuators 20, 22. When manipulated by the machine operator, joystick 24 may initiate a command to hydraulic control system 26 to regulate a flow of pressurized fluid (e.g., hydraulic fluid) to first and second tool actuators 20, 22 to move tool 12. Joystick 24 may regulate both a flow rate and a direction of flow to first and second tool actuators 20, 22, thereby controlling a speed and a movement direction of tool 12.

Figure 2:
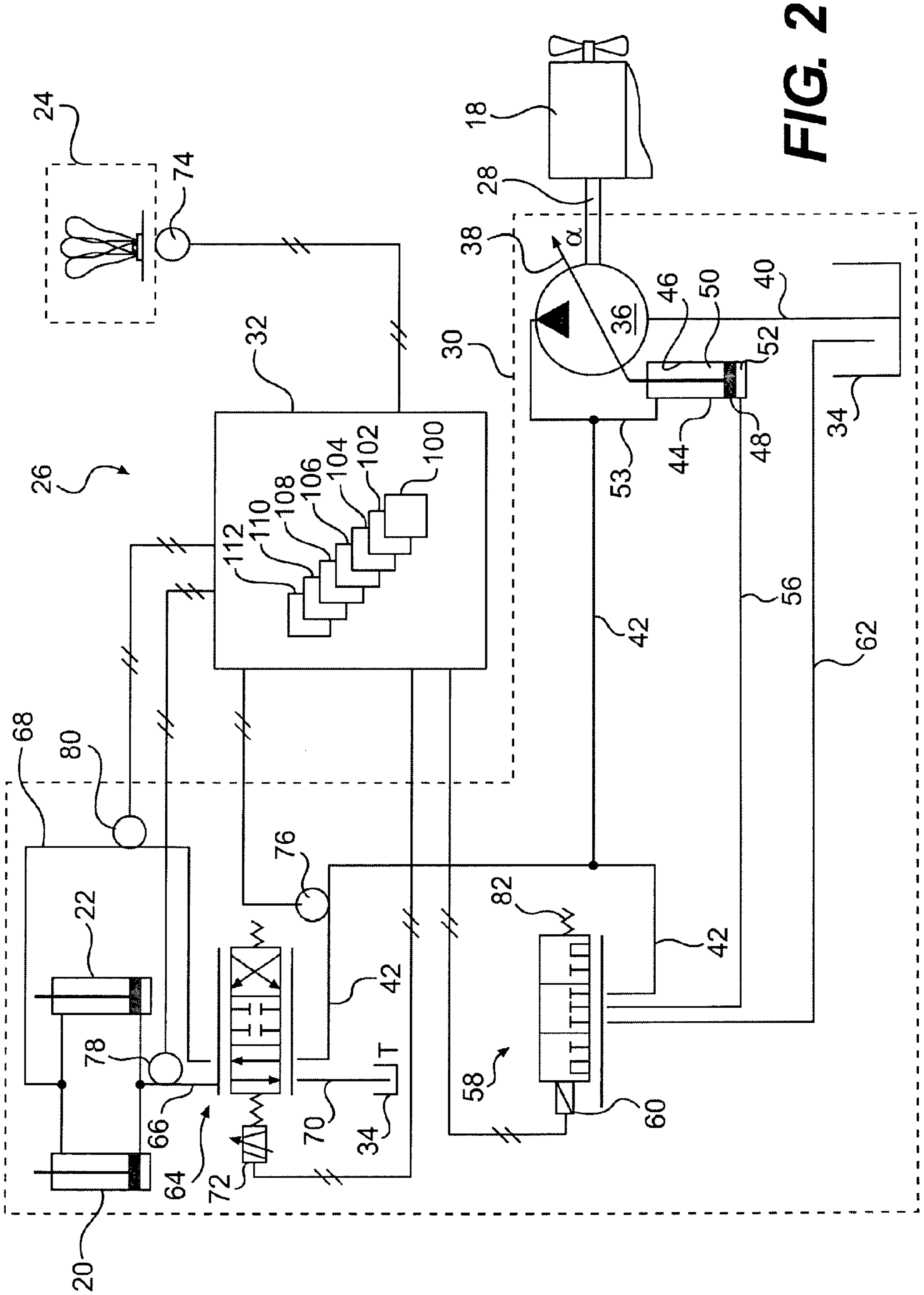
FIG. 2 is a schematic of an exemplary hydraulic control system that may be used with machine of FIG. 1.

Referring now to FIG. 2, power source 18 may power a hydraulic control system 26 associated with first and second tool actuators 20, 22. Power source 18 may be an engine, such as, for example, a diesel engine, a gasoline engine, a natural gas engine, or any other engine apparent to one skilled in the art. In at least one embodiment, power source 18 may be configured to provide substantially constant rotational power to hydraulic control system 26 by way of a shaft 28.

Hydraulic control system 26 may include a hydraulic circuit 30 and a controller 32. Controller 32 may control various components of hydraulic control system 26 to control fluid flow through hydraulic circuit 30. Hydraulic circuit 30 may consist of various hydraulic components used to direct the flow of pressurized fluid within hydraulic control system 26. For example, hydraulic circuit 30 may include a tank 34, a pump 36, first and second tool actuators 20, 22, and other components, as will be discussed below. Pump 36 may utilize rotational power provided by power source 18 to draw fluid from tank 34 and pressurize the fluid for use by first and second tool actuators 20, 22. Controller 32 may be operatively connected to pump 36, first and second tool actuators 20, 22, and power source 18, to selectively direct pressurized fluid to move tool 12 that is connected to first and second tool actuators 20, 22.

Pump 36 may draw fluid from tank 34 and pressurize it for use within hydraulic circuit 30. Pump 36 may be, for example, a variable displacement hydraulic pump having a tiltable swashplate 38. Pump 36 may draw fluid from tank 34 via a pump input port 40 and deliver the fluid under pressure to a hydraulic passageway 42 at a discharge flow rate corresponding to a tilt angle α of swashplate 38 and a rotational speed of shaft 28.

The discharge flow rate of pump 36 may be controlled by varying tilt angle α using a pump actuator, for example, tilt actuator 44. At a maximum tilt angle α, tilt actuator 44 may cause a maximum discharge flow rate of pump 36. In contrast, at a minimum tilt angle α, tilt actuator 44 may cause a minimum discharge flow rate of pump 36. As such, the discharge flow rate, and hence pressure of hydraulic circuit 30, may be regulated primarily by controlling the movement of swashplate 38 by tilt actuator 44.

Tilt actuator 44 may be any component configured to adjust tilt angle α and, thereby, adjust the discharge flow rate of pump 36. In one exemplary embodiment, tilt actuator 44 may include a cylinder 46 and a piston 48 arranged to form a first chamber 50 and a second chamber 52. First chamber 50 may be constantly supplied with pressurized fluid from pump 36 via a first chamber passageway 54. Second chamber 52 may be selectively supplied with or drained of fluid by way of a second chamber passageway 56.

A pump control valve 58 may be situated in communication with second chamber passageway 56 to control the flow of fluid to and from second chamber 52 to adjust the tilt angle α of swashplate 38. Pump control valve 58 may be one of various types of control valves including, for example, a spool valve. In one example, pump control valve 58 may be a three-way proportional spool valve. That is, pump control valve 58 may be infinitely variable between three operating states (discussed in more detail below), at which fluid flow is selectively passed through or blocked from three separate passageways.

Pump control valve 58 may be actuated using a pump control valve actuator. For example, pump control valve 58 may be actuated using a solenoid, a servomechanism, a pilot operated mechanism, or in any other manner known to one skilled in the art. As shown in the embodiment of FIG. 2, a solenoid 60 may be energized by controller 32 to move pump control valve 58 between the first, second, and third states.

In the first state (shown in FIG. 2), pump control valve 58 may substantially block fluid flow between hydraulic passageway 42 and second chamber passageway 56. Additionally, in the first state, fluid flow between second chamber passageway 56 and a pump drain passageway 62 may also be substantially blocked. In the first state, substantially no adjustment of the tilt angle α of swashplate 38 will occur.

In the second state, pump control valve 58 may connect second chamber passageway 56 with pump drain passageway 62, allowing a variable amount of fluid to flow from second chamber 52 to tank 34, depending on the relative position of the spool within pump control valve 58, effectively depressurizing second chamber 52. In this state, pressurized fluid in first chamber 50 may cause piston 48 to retract into cylinder 46, thereby decreasing the effective length of tilt actuator 44 and increasing the tilt angle α of swashplate 38.

In the third state, pump control valve 58 may connect the output of pump 36 with second chamber passageway 56 by way of hydraulic passageway 42, allowing a variable amount of fluid to enter second chamber 52, depending on the relative position of the spool within pump control valve 58. In this state, pressurized fluid flowing into second chamber 52 may act on piston 48, causing piston 48 to extend (i.e., enlarging the volume of second chamber 52), thereby increasing the effective length of tilt actuator 44 and reducing the tilt angle α of swashplate 38. Alternatively, it is contemplated that tilt actuator 44 may be reconfigured such that an extension of piston 48 may cause an increase in tilt angle α and a retraction of piston 48 may cause a decrease in tilt angle α of swashplate 38, if desired. In either the second state or the third state, the position of the spool of pump control valve 58 may be varied within a range to vary the rate of flow to or from tilt actuator 44.

A tool control valve 64 may receive a flow of pressurized fluid via hydraulic passageway 42 from pump 36 to supply fluid into first and second tool actuators 20, 22 to move tool 12. Fluid may be directed to first and second tool actuators 20, 22 via a first tool supply passageway 66 (i.e., for extending tool actuators 20, 22) or a second tool passageway 68 (i.e., for retracting tool actuators 20, 22), depending on the operating state of tool control valve 64. Fluid from first and second tool actuators 20, 22 may be drained via a tool drain passageway 70. Tool control valve 64 may be actuated by a tool control valve actuator including, for example, a servomechanism, a solenoid, a pilot operated mechanism, or in any other manner known to one skilled in the art. As shown in the embodiment of FIG. 2, a servomechanism 72 may be energized by controller 32 to move tool control valve 64 to move tool 12.

A machine operator may command movement of tool 12 using joystick 24, and a control sensor 74 may be situated to generate signals indicative of the operator command. That is, control sensor 74 may generate and transmit a signal to controller 32 that is proportional to a displacement of joystick 24 away from a neutral position. This signal may be received by controller 32, and controller 32 may determine a command (discussed in greater detail below) to responsively energize servomechanism 72 to move tool control valve 64 a corresponding amount that results in the desired adjustment of first and second tool actuators 20, 22 to move tool 12.

Controller 32 may embody a single microprocessor, or multiple microprocessors that include a means for controlling and operating components of hydraulic control system 26. One or more maps relating various system parameters may be stored in the memory of controller 32. Each of these maps may include a collection of data in the form of tables, graphs, equations and/or another suitable form. The maps may be automatically or manually selected and/or modified by controller 32 or an operator to affect actuation of components attached to machine 10. It is also contemplated that hydraulic control system 26 may permit controller 32 to access other control functions (e.g., equations, look-up tables), in lieu of using a map.

As first and second tool actuators 20, 22 extend or retract to move tool 12 according to operator input, the fluid moving into first and second tool actuators 20, 22 may affect the pressure across tool control valve 64. A pressure drop across tool control valve 64 may be sensed by one or more pressure sensors. For example, a first pressure sensor 76 may be positioned along hydraulic passageway 42 to sense a fluid pressure between pump 36 and tool control valve 64. More specifically, first pressure sensor 76 may be positioned in close proximity to tool control valve 64. Similarly, a second pressure sensor 78 may be positioned along first tool supply passageway 66 to sense a fluid pressure between tool control valve 64 and first and second tool actuators 20, 22, for example, during an extension of tool 12. Likewise, a third pressure sensor 80 may be positioned along second tool supply passageway 68 to sense a fluid pressure between tool control valve 64 and first and second tool actuators 20, 22, for example, during a retraction of tool 12. First, second, and third pressure sensors 76, 78, 80 may transmit pressure signals to controller 32. Controller 32 may receive pressure signals from first, second, and third pressure sensors 76, 78, 80 and compare these signals to determine an actual pressure gradient value across tool control valve 64.

Controller 32 may store in its memory a loading sensing control map 100 relating actual pressure gradient values across tool control valve 64 with one or more predetermined pressure gradient values. It is contemplated that loading sensing control map 100 may include various predetermined pressure gradient values for different operating conditions. Although, it is also contemplated that a single predetermined pressure gradient value may be stored for use under all operating conditions. Using load sensing control map 100, if controller 32 determines that the actual pressure gradient value across tool control valve 64 deviates from the predetermined pressure gradient value, by more than an acceptable amount, controller 32 may identify an error and generate a load sense control signal to regulate pump control valve 58. Based upon the load sense control signal, controller 32 may cause pump control valve 58 to vary the flow of fluid to tilt actuator 44.

For example, if the actual pressure gradient value is lower than the predetermined pressure gradient value, controller 32 may command pump control valve 58 to operate in the second state, thereby, increasing the discharge flow rate of pump 36. In contrast, if the actual pressure gradient value is higher than expected, controller 32 may command pump control valve 58 operate in the third state, thereby decreasing the discharge flow rate of pump 36. In this manner, a substantially constant pressure gradient across tool control valve 64 may tend to be maintained, at least when flow demand by hydraulic control system 26 is not overly abrupt or transient.

In order for controller 32 to command movement of pump control valve 58, one or more pump control valve maps related to operation of pump control valve 58 may be used. For example, controller 32 may store in its memory a pump control valve position map 102 relating a position of pump control valve 58 to a discharge flow rate of pump 36. Pump control valve position map 102 may be used by controller 32 to determine an adjustment of the position of tool control valve 58 required to attain desired movements of tilt actuator 44. In some situations, it may also be necessary to calculate a force required by solenoid 60 to properly position pump control valve 58 to attain a desired fluid flow rate. To facilitate this calculation, controller 32 may store in its memory a pump control valve force map 104 relating a position of pump control valve 58 and to a force (e.g., fluid pressure) required to move pump control valve 58 into position. Specifically, pump control valve force map 104 may contain a constant "k" associated with a biasing device, for example, return spring 82 acting against solenoid 60, and relate a corresponding force required of solenoid 60 to move pump control valve 58 with an energizing current, which may help controller 32 command an adjustment of the discharge flow rate of pump 36. Further, controller 32 may store in its memory a pump control valve current map 106 relating energizing current and/or fluid pressure to the required solenoid force. That is, pump control valve current map 106 may also help controller 32 command an adjustment of the discharge flow rate of pump 36.

To improve responsiveness of hydraulic control system 26, a feed-forward control may be employed. While it is contemplated that feed-forward control may be used as an alternative to load sense control, it may be desirable to use feed-forward in combination with load sensing in order to take advantage of the responsive characteristics of feed-forward control and the ability of load sensing control to verify the accuracy of the feed-forward adjustments and correct for any inaccuracy. Feed-forward control may be capable of estimating a change in flow demand associated with a tool movement request of tool 12 by a machine operator. Further, the feed-forward control may be capable of estimating a change in a pressure gradient across tool control valve 64. The estimated change in the pressure gradient may be related to the estimated change in flow demand and may be associated with the activation of tool 12. For example, fluid flowing into hydraulic passageway 42 from pump 36 may tend to cause an increase in pressure within hydraulic passageway 42. Alternatively, fluid flowing out of hydraulic passageway 42 into first and second tool actuators 20, 22 may tend to cause a decrease in pressure within hydraulic passageway 42.

Based on the estimated flow demand changes, feed-forward control may regulate the discharge flow rate of pump 36 and may compensate for pressure changes across tool control valve 64 resulting from actuation of tool 12. Feed-forward control may be used to vary the supply of fluid before it is required, or as it is required, by hydraulic control system 26. As used herein, feed-forward control may refer to a control system that responds to an estimated disturbance in a predefined way. For example, when movement of tool 12 is commanded, feed-forward control may respond to an estimated change in flow demand at about the same time as a corresponding change in pressure occurs. It is contemplated that feed-forward control may adjust the discharge flow rate of pump 36 to accommodate for the estimated change in flow demand across tool control valve 64. The adjustment of the discharge flow rate of pump 36 may occur at about the same time as, or before controller 32 commands actuation of tool 12 via tool control valve 64.

In one exemplary embodiment of feed-forward control, controller 32 may receive signals generated by control sensor 74. These signals, for example, may be indicative of the position of joystick 24, as manipulated by the machine operator. Upon receiving signals generated by control sensor 74, controller 32 may begin to calculate a feed-forward control response. The feed-forward control response may include commands made by controller 32 to adjust the discharge flow rate of pump 36 at about the same time as, or before, tool 12 is moved as commanded by the machine operator.

Feed-forward control response may be determined by controller 32 using a feed-forward control map 108 stored in the memory of controller 32. For example, controller 32 may compare the signal received from control sensor 74 to feed-forward control map 108 relating the tool movement request (i.e., the position of joystick 24) to a change in the discharge flow rate of pump 36. Controller 32 may then use feed-forward control map 108 to estimate a change in flow demand required by first and second tool actuators 20, 22 to move tool 12. For example, if the operator initiates a tool movement request indicative of an increase in flow demand, controller 32 may increase the discharge flow rate of pump 36. Conversely, if the operator initiates a tool movement request indicative of a decrease in flow demand, controller 32 may decrease the discharge flow rate of pump 36.

Upon determining the new discharge flow rate of pump 36, controller 32 may implement at least one of pump control valve maps 102, 104, 106 related to pump control valve 58 to determine a command from controller 32 to solenoid 60 of pump control valve 58. That is, controller 32 may employ pump control valve position map 102 relating the discharge flow rate of pump 36 to a position of pump control valve 58 required to adjust tilt actuator 44 to implement the changed discharged flow rate of pump 36. Since pump control valve 58 may be biased by return spring 82, controller 32 may employ pump control valve force map 104 containing the spring constant "k" to determine the force required by solenoid 60 to move pump control valve 58. Finally, controller 32 may employ pump control valve current map 106 relating the force required to move pump control valve 58 into the position required to cause the changed discharge flow rate of pump 36 to an energizing current required by solenoid 60.

In a situation when controller 32 indicates an increased flow demand, controller 32 may, for example, command pump control valve 58 into its second state to increase the discharge flow rate of pump 36. Likewise, in a situation when controller 32 indicates a decreased flow demand, controller 32 may, for example, command pump control valve 58 into its third state to decrease the discharge flow rate of pump 36.

It is contemplated that controller 32 may adjust the discharge flow rate of pump 36 by commanding the feed-forward control response in combination with the load sense control response. Each of these responses may be commanded by controller 32 to occur independently or at about the same time, as will be discussed in more detail below.

In order to control tool 12 in accordance with operator input from joystick 24, controller 32 may also utilize signals from control sensor 74 to command a tool control response command. The tool control response command may be commanded by controller 32 at about the same time as, or just after commanding the feed-forward control response. The tool control response command may be executed by controller 32 to actuate first and second tool actuators 20, 22 to move tool 12 as desired by the machine operator.

Controller 32 may store in its memory a tool control map 110 relating a tool movement request to a fluid output of tool control valve 64. Tool control map 110 may be used to determine a change in fluid output of tool control valve 64. In order to command an adjustment of tool control valve 64 in accordance with the determined change of fluid output of tool control valve 64, controller 32 may store in its memory a tool command map 112 relating the determined change in fluid output of the tool control valve 64 to a position of the tool control valve 64. Upon determining the position required by tool control valve 64, controller 32 may command servomechanism 72 to adjust tool control valve 64 to move tool 12, for example, by passing fluid through one of first and second supply passages 66, 68 and draining fluid into tank 34 via drain passage 70.

INDUSTRIAL APPLICABILITY

The disclosed hydraulic control system may find potential application in any machine regulating the discharge flow rate of a pump. The disclosed solution may find particular applicability in hydraulic tool systems, especially hydraulic tool systems for use onboard mobile machines.

Figure 3:
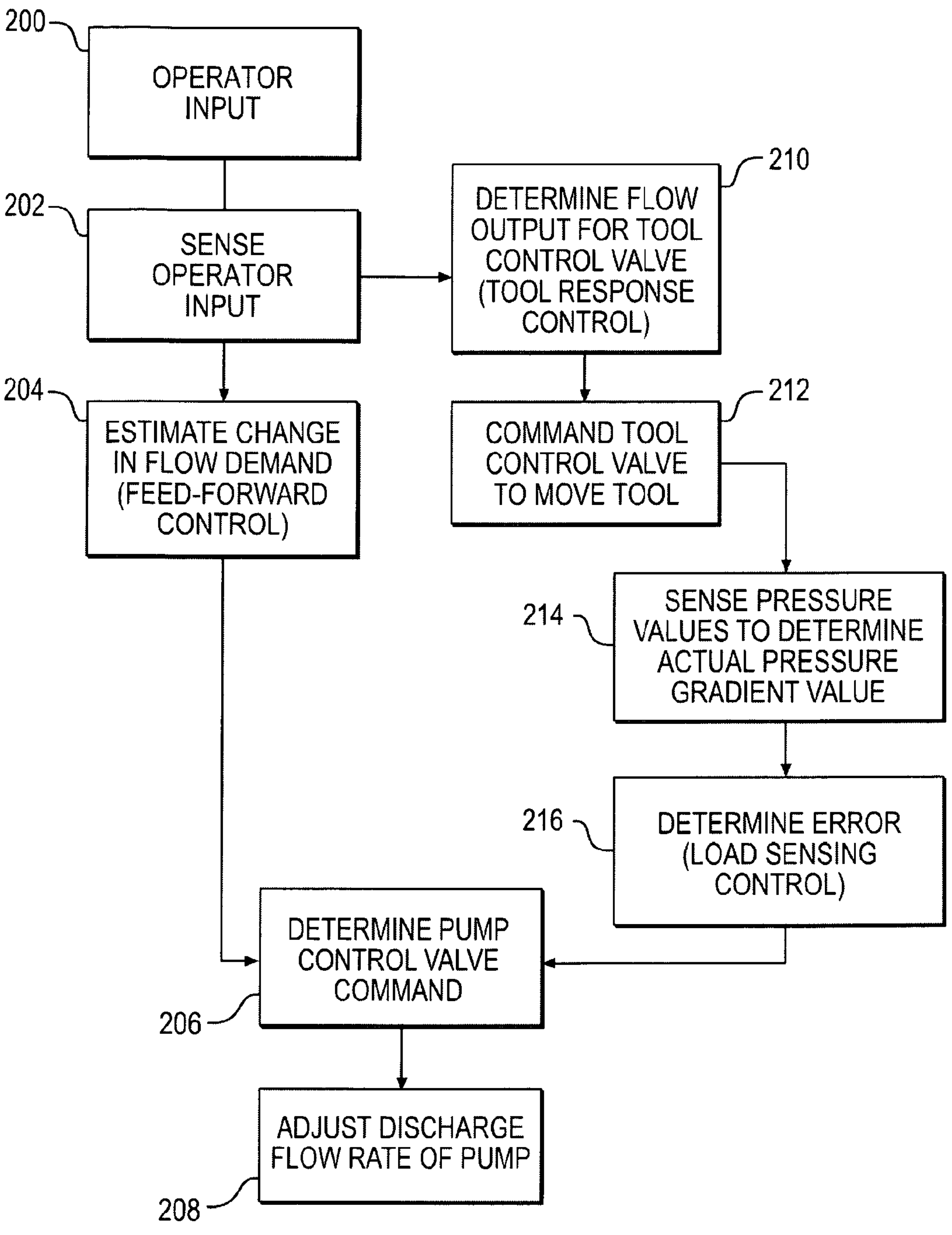
FIG. 3 is a flow diagram illustrating an exemplary feed-forward and load sensing control process performed by the hydraulic control system of FIG. 2.

As shown in FIG. 3, a machine operator may initiate a process of regulating operation of hydraulic control system 26 by implementing feed-forward control in combination with load sensing control to adjust a discharge flow rate of pump 36 to meet variable flow demands of machine 10. During operation of hydraulic control system 26, a machine operator may provide operator input, for example, via joystick 24 to initiate a tool movement request (Step 200). Operator input may be sensed by control sensor 74 (Step 202), which may generate an operator input signal (e.g., tool movement request) that is forwarded to controller 32. The operator input signal (e.g., tool movement request) may be received by controller 32 and may be used in combination with one or more maps to generate at least two response signals (e.g., a feed-forward response signal or a tool response signal).

Controller 32 may determine a feed-forward response signal using one or more maps. More specifically, controller 32 may use, for example, feed-forward control map 108 to estimate a change in flow demand across tool control valve 64 caused by operator input (Step 204). To compensate for the estimated change in flow demand and, thus, a corresponding related change in pressure gradient, controller 32 may determine an adjustment of the discharge flow rate of pump 36 sufficient to meet the estimated flow demand rate. Further, controller 32 may implement one or more pump control valve maps 102, 104, 106 to determine a command for pump control valve 58 sufficient to implement the adjustment of discharge flow rate of pump 36 (Step 206). Once controller 32 estimates the adjustment of pump discharge flow rate for feed-forward control and determines a command for pump control valve 58, controller 32 may command pump control valve 58 to adjust tilt actuator 44 in order to modify the discharge flow rate of pump 36 in accordance with the estimated change in flow demand (Step 208).

Subsequently or concurrently, controller 32 may generate a tool response signal using one more maps. More specifically, controller 32 may utilize tool control map 110 to determine a tool response signal using operator input sensed by control sensor 74 and tool command map 112 to determine how to command tool control valve 64 to implement the tool control (Step 210). Controller 32 may then send the tool control response command to servomechanism 72 to adjust tool control valve 64, which may extend or retract first and second tool actuators 20, 22 to move tool 12 (Step 212). Fluid flow to first and second tool actuators 20, 22 may cause a change in pressure drop across tool control valve 64, which may be sensed by first, second, and third pressure sensors 76, 78, 80.

Controller 32 may implement load sensing control by first receiving pressure signals from first, second, and third pressure sensors 76, 78, 80 to determine an actual pressure gradient value (Step 214). Controller 32 may implement one or more maps to determine a pump discharge flow adjustment in response to load sensing control. More specifically, controller 32 may implement load sensing control map 100 to determine if there is an error. That is, an error may be defined when the actual pressure gradient value deviates by more than an acceptable amount from the predetermined pressure gradient value (Step 216). Based on an error determined between the actual pressure gradient value and the predetermined pressure gradient value, controller 32 may initiate a command to correct the error by comparing the error to a correction factor in load sensing control map 100. Further, controller 32 may implement one or more pump control valve maps 102, 104, 106 to determine a command for pump control valve 58 to correct the error (Step 206). Once controller 32 determines the correction factor for load sensing control and determines a command for pump control valve 58 to cause adjustment of the discharge flow rate based on the error, controller 32 may command pump control valve 58 to adjust tilt actuator 44 to adjust of the discharge flow rate of pump 36.

In a first example, a machine operator may command tool 12 to be lifted at a rate corresponding to, for example, twenty percent of the maximum lift rate. Referring now to FIG. 3, the machine operator may command this lift rate by manipulating joystick 24. As a result of the operator's command, control sensor 74 may generate a signal (e.g., tool movement request) indicative of the twenty percent desired tool lift rate. Upon receiving the signal, controller 32 may implement feed-forward control map 108 in combination with pump control valve maps 102, 104, 106 to determine a command to adjust pump control valve 58 into the second state to increase the discharge output of pump 36. At the same time, or about the same time, as implementing feed-forward control, controller 32 may implement tool control via tool control map 110 and tool command map 112 to command tool control valve 64 to move tool 12. Further, controller 32 may implement load sensing control by utilizing first, second, and third pressure sensors 76, 78, 80 to monitor the pressure gradient across tool control valve 64. Upon receiving the pressure signals, controller 32 may implement load sensing control map 100 in combination with pump control valve maps 102, 104, 106 to determine if an actual pressure drop value deviates more than an acceptable amount compared to a predetermined pressure drop and then to determine a command to adjust pump control valve 58 in accordance with the adjustment of the discharge flow rate of pump 36. That is, load sensing control may help determine if feed-forward control misestimated the flow demand. For example, in a situation when feed-forward control overestimated the flow demand, controller 32 may command a corrective decrease in the discharge flow rate of pump 36.

In a second example, the machine operator may adjust the lift rate from a lift rate corresponding to twenty percent of the maximum lift rate down to a rate corresponding to five percent of the maximum lift rate. The machine operator may command this lift rate by manipulating joystick 24. As a result of the operator's command, control sensor 74 may generate a signal (e.g., tool movement request) indicative of the five percent desired tool lift rate. Controller 32 implementing feed-forward control may recognize a decrease in flow demand and controller 32 may act accordingly to decrease discharge output of pump 36. Further, controller 32 implementing load sensing control may sense via first, second and third pressure sensors 76, 78, 80 that feed-forward control misestimated the flow demand. For example, in a situation when feed-forward control underestimated the flow demand, controller 32 may command a corrective increase in the discharge flow rate of pump 36.

While the disclosed embodiment includes a plurality of maps (e.g., 100, 102, 104, 106, 108, 110, and 112), any number or organization of maps sufficient to command controller 32 to regulate the flow of fluid within hydraulic control system 26 may be utilized. For example, one or more of the plurality of maps may be combined into a single map or divided into additional maps. Further, hydraulic control system 26 may include various components to regulate flow demand of machine 10. For example, in situations when machine 10 includes a plurality of tools or various actuators to operate the tools, hydraulic control system 26 may include any number or type of components sufficient to implement feed-forward control and load sensing control.

The disclosed method and apparatus may increase system stability and system response by estimating, anticipating, and/or counteracting changes in the flow demand before they occur. By employing hydraulic control system 26 that utilizes feed-forward control, to quickly anticipate and respond to flow demand, in combination with load sensing control, to verify that the flow demand commanded in response to feed-forward control is within an acceptable range, hydraulic control system 26 may enable more responsive and more accurate regulation of the pressure gradient than previous systems.

It will be apparent to those skilled in the art that various modification and variations can be made to the disclosed hydraulic control system, without departing from the scope of the disclosure. Other embodiments of the disclosed hydraulic control system will be apparent to those skilled in the art from consideration of the specification and practice disclosed herein. It is intended that the specification and examples be considered as exemplary only, with the true scope being indicated by the following claims and their equivalents.

What is claimed is:

1. A hydraulic control system, comprising:
a pump;
a tool actuator configured to move a tool with a flow of pressurized fluid provided by the pump;
a tool control valve configured to control the flow of pressurized fluid to the tool actuator; and
a controller, including a feed-forward control map that responds to an estimated disturbance in a predefined way configured to relate the tool movement request to a change of discharge flow rate of the pump, operably connected with the tool control valve and the pump, the controller being configured to:
receive a tool movement request;
estimate a change in a flow demand across the tool control valve associated with the tool movement request with the feed-forward control map; and
command adjustment of a discharge flow rate of the pump based on the estimated change in flow demand to satisfy the tool movement request.

2. The hydraulic control system of claim 1, further including a control sensor configured to sense an indication of the tool movement request based upon an operator manipulation of a tool control device.

3. The hydraulic control system of claim 2, further including a pump control valve configured to control a flow of pressurized fluid to a pump actuator.

4. The hydraulic control system of claim 3, wherein the controller includes a pump control valve position map relating a position of the pump control valve with a discharge flow rate of the pump, and the controller is configured to command adjustment of the discharge flow rate by implementing the pump control valve position map.

5. The hydraulic control system of claim 4, wherein the controller includes a pump control valve force map relating the position of the pump control valve to a force required to adjust the pump control valve against a biasing device, and the controller is configured to command adjustment of the discharge flow rate by implementing the pump control valve force map.

6. The hydraulic control system of claim 5, wherein the controller includes a pump control valve current map relating the force required to adjust the pump control valve against a biasing device to an energizing current required by a valve actuator to adjust the position of the pump control valve, and the controller is configured to command adjustment of the discharge flow rate by implementing the pump control valve current map.

7. The hydraulic control system of claim 2, wherein the controller includes a tool control map relating the tool movement request to a fluid output of the tool control valve, and the controller is further configured to determine a change in fluid output of the tool control valve by implementing the tool control map.

8. The hydraulic control system of claim 7, wherein the controller includes a tool command map relating the change of fluid output of the tool control valve to a position of the tool control valve, and the controller is further configured to command a change in the position of the tool control valve by implementing the tool command map to move the tool.

9. The hydraulic control system of claim 8, wherein the controller is configured to command the adjustment of the discharge flow rate of the pump at about the same time as the controller is configured to command the change in the position of the tool control valve.

10. The hydraulic control system of claim 8, wherein the controller is configured to command the adjustment of the discharge flow rate of the pump before commanding the change in position of the tool control valve.

11. The hydraulic control system of claim 1, further including at least one pressure sensor configured to sense at least one pressure value and transmit the at least one pressure value to the controller, such that the controller is configured to determine an actual pressure gradient value, and the controller is configured to determine an error by comparing the actual pressure gradient value to a predetermined pressure gradient value.

12. The hydraulic control system of claim 11, wherein the controller includes a load sensing control map relating the error to a change in discharge flow rate of the pump, and the controller is configured to determine an additional change in discharge flow rate of the pump by implementing the load sensing control map.

13. The hydraulic control system of claim 12, wherein the controller includes at least one pump control valve map relating the additional change in discharge flow rate of the pump to a characteristic of a pump control valve, and the controller is configured to command the adjustment of the discharge flow rate of the pump by implementing the at least one pump control valve map.

14. A method for controlling movement of a tool with a hydraulic control system, comprising:

pressurizing fluid with a pump;

receiving an operator command to move the tool;

estimating a change in a flow demand in the hydraulic control system based on the operator command to move the tool with a feed-forward control map that responds to an estimated disturbance in a predefined way configured to relate the operator command to move the tool to a change of discharge flow rate of the pump;

adjusting a discharge flow rate of the pump based on the estimated change in the flow demand; and directing at least a portion of the pressurized fluid to move the tool based on the operator command.

15. The method of claim 14, further including determining a pressure drop across a tool control valve, wherein adjusting the discharge flow rate of the pump includes adjusting the discharge flow rate based on the pressure drop across the tool control valve, in addition to adjusting the discharge flow rate of the pump based on the estimated change in flow demand.

16. The method of claim 14, further including adjusting the discharge flow rate of the pump based on the estimated change in the flow demand at about the same time as directing at least a portion of the pressurized fluid to move the tool.

17. The method of claim 14, further including adjusting the discharge flow rate of the pump based on the estimated change in the flow demand before directing at least a portion of the pressurized fluid to move the tool.

18. A machine, comprising:

a power source;

a pump mechanically driven by the power source;

a pump actuator fluidly connected to the pump and configured to adjust a displacement of the pump;

a tool actuator configured to receive a flow of pressurized fluid from the pump to move a tool;

a tool control valve configured to control the flow of the pressurized fluid to the tool actuator;

a control sensor configured to generate a first signal indicative of a tool movement request; and a controller, including a feed-forward control map that responds to an estimated disturbance in a predefined way configured to relate the tool movement request to a change of discharge flow rate of the pump, operably connected with the control sensor and the tool control valve, the controller being configured to:

estimate a change in a flow demand across the tool control valve associated with the tool movement request with the feed-forward control map;

command movement of the tool control valve to satisfy the tool movement request; and command a flow of pressurized fluid to the pump actuator to adjust the discharge flow rate of the pump to accommodate the estimated change in the flow demand at about the same time that the tool control valve is commanded to move to satisfy the tool movement request.

19. The machine of claim 18, further including at least one pressure sensor configured to generate a second signal indicative of one or more pressure values, the controller being operably connected with the at least one pressure sensor and further configured to:

determine an error based on an difference between an actual pressure gradient value across the tool control valve based on the second signal and a predetermined pressure gradient value across the tool control valve;

command a flow of pressurized fluid to the pump actuator to adjust the discharge flow rate of the pump based on the error.

* * * * *